United States Patent [19]

Takahashi

[11] Patent Number: 4,968,546
[45] Date of Patent: Nov. 6, 1990

[54] COMPONENT PARTS FOR HIGH TEMPERATURE SUFFERING TRANSFER MEANS

[75] Inventor: Susumu Takahashi, Yokohama, Japan

[73] Assignee: Kanto Yakin Kogyo K.K., Yijiganam, Japan

[21] Appl. No.: 305,618

[22] Filed: Feb. 3, 1989

[30] Foreign Application Priority Data

Feb. 9, 1988 [JP] Japan .................. 63-28516

[51] Int. Cl.$^5$ .................. B65G 17/06; B32B 7/02
[52] U.S. Cl. .................. 428/36.3; 428/105; 428/109; 428/110; 428/220; 428/222; 428/360; 428/367; 428/378; 428/408; 428/688; 428/902; 198/847; 198/852; 198/853
[58] Field of Search .................. 428/36.3, 222, 360, 428/367, 378, 688, 902, 408, 109, 105, 110, 220; 198/847, 852, 853

[56] References Cited

U.S. PATENT DOCUMENTS

| | | | |
|---|---|---|---|
| 4,157,181 | 6/1979 | Cecka | 273/80 R |
| 4,283,446 | 8/1981 | McLain | 428/36.3 |
| 4,346,138 | 8/1982 | Lefferts | 428/222 |
| 4,481,079 | 11/1984 | Dawes | 162/348 |
| 4,514,458 | 4/1985 | Thorn et al. | 428/222 |
| 4,528,236 | 7/1985 | Finn et al. | 428/222 |
| 4,575,472 | 3/1986 | Lefferts | 428/222 |
| 4,621,980 | 11/1986 | Reavely et al. | 416/226 |
| 4,796,749 | 1/1989 | Lefferts | 198/851 |

Primary Examiner—Ellis P. Robinson
Assistant Examiner—Archene A. Turner
Attorney, Agent, or Firm—Shlesinger, Fitzsimmons & Shlesinger

[57] ABSTRACT

Carbon or inorganic fibers are wound up cylindrically so as to have numerous intersections to each other. They are bound integrally to each other at points including their intersections to form cylindrical component parts which may be used within an extremely high-temperature furnace, such as when used as parts of belt conveyors and trays for carrying articles to be treated within the furnace. The cylinders thus made are comparatively thin and extremely light in weight, while they are afforded with a tensile strength sufficiently high enough to stand against loads exerted thereupon in the furnace.

3 Claims, 1 Drawing Sheet

COMPONENT PARTS FOR HIGH TEMPERATURE SUFFERING TRANSFER MEANS

BACKGROUND OF THE INVENTION

This invention relates to component parts which compose transfer means utilized under a high temperature, such as trays and conveyors which carry thereupon articles to be treated in a high temperature furnace, and which are made from carbon or inorganic filaments wound up cylindrically.

In case of a heat-treatment furnace operated at a temperature of less than about 1,200° C., belt conveyors which are circulated through the furnace, are generally made by fabricating thermal resistant steel wires which can stand on up to said furnace temperature, and trays which transfer articles thereupon being moved on the belt conveyor, are likewise made from thermal resistant steels.

When a furnace is to be operated at a temperature higher than 1,200° C., other metallic materials such as molybdenum and tungsten are employed for making high-temperature suffering transfer means such as above-mentioned conveyors and trays, while they are often made from carbon or graphite materials when a furnace temperature reaches more than 1,800° C. as they can well stand up to 3,000° C.

The present inventor had invented a belt conveyor of a configuration such as shown in the accompanying drawing (FIG. 1), which are made from carbon or graphite materials. This conveyor comprises a number of component parts 1 which have been made by flattening cylinders formed by winding up carbon filaments. Such flattened cylinders are hingedly trained in series, and connected to each other by hinge pins 2 and nuts 3.

And, trays which are also made from carbon on graphite materials, has been invented by the present inventor, too. A part of such trays is illustrated in FIG. 2, in which a cylindrical component part 5 is made by winding up carbon filaments cylindrically. Numeral 6 indicates a connector block made from graphite materials and having connecting arms 7. A plurality of the cylindrical component parts 5 are connected through the connector blocks 6 to form a tray of a curb-like shape, for example. Those belt conveyors and trays the present inventor has invented, are further improved as described hereinafter.

BRIEF SUMMARY OF THE INVENTION

As described above, cylindrically wound up carbon filaments as shown in FIG. 3 can be employed as component parts of trays, as they are. And, the filaments so wound up can be utilized as high-temperature resistant component parts of belt conveyors, when they are further flattened as a whole. Those transfer means which are composed of such component parts, are undoubtedly advantageous in respect of their high thermal resistibility and lightness in weight.

Whereas, a consideration is given to that tensile strength of common carbon filaments available in the market is 100–500 Kg/mm$^2$ at a high temperature of 1,000° to 3,000° C., while even carbon filaments of a low grade have a tensile strength of 100–200 Kg/mm$^2$. Therefore, when a conveyor belt such as illustrated in FIG. 1 and having a width of 200 mm, is composed of a plurality of flattened cylindrical component parts which are made by winding up carbon filaments of above-mentioned tensile strength to a thickness of 1 mm, the nominal tensile strength of the conveyor belt will be 20,000–40,000 Kg/mm$^2$. This strength is excessive, when it is considered that a tensile strength normally required to a belt conveyor for a high temperature heat treatment furnace is 20–40 Kg/mm$^2$.

In other words, said strength is about 1,000 times of a normal tensile strength required to a belt conveyor of the kind mentioned above. Even when carbon filaments were wound up to a thickness of 0.2 mm, a tensile strength of cylindrical component parts then obtained would be excessive than what is normally required.

In this view, the cylindrical component parts do not need a thickness as much as 1 mm, but could be far thinner. This is the object of this invention the present inventor has improved.

In this invention, differently to the present inventor's prior conception that carbon filaments 9 are wound up merely cylindrically around a mandril 8 as illustrated in FIG. 3 so that each of the filaments is in alignment to each other substantially in parallel and also in abutment laterally side by side to each other, the filaments are wound up cylindrically as shown in FIG. 4 particularly so that they make numerous intersections, and are integrally bound to each other, resulting in providing cylindrical component parts not having unnecessary thicknesses but being lighter in weight, for examples, about 1.3 gr./cm$^3$.

EXAMPLE

Figure 4:
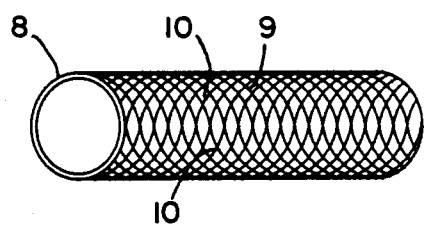
FIG. 4 is a view similar to FIG. 3 in which the method how fibers are wound up in accordance with this invention, is illustrated.

As shown in FIG. 4, around the mandrel 8 of 25 mm in diameter, three bundles, each consisting of about three carbon filaments 9 of high strength and of about 7 μm in diameter were wound up so that they made to each other a large number of intersections 10. Carbonic adhesives, such as a phenolic resin, were applied on the filaments for fixedly binding them to each other.

Figure 1:
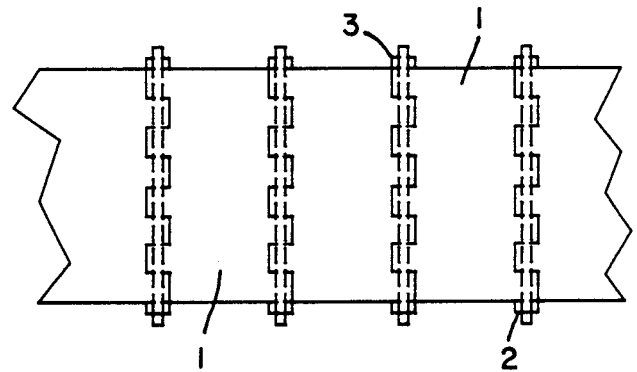
FIG. 1 is a plan view of a belt conveyor composed from 1 component parts made in accordance with this invention.

Then, the cylindrically shaped carbon filaments were subjected to a heat-treatment at 300° C. for having made the adhesives infusible. Then, the cylinder was heated in an inert atmospheric furnace at 1,000° C. for carbonizing it. The cylinder was flattened. A plurality of flattened cylindrical carbon compounded component parts were then assembled to a conveyor belt as shown in FIG. 1.

The conveyor had thermal resistibility sufficient enough to be a transfer means circulated through a heat-treatment furnace kept at a high temperature more than 1,800° C. Its tensile strength was sufficiently high, too, and its lightness in weight did not give an excessive load to a driving source of the belt conveyor. It was noticed also that a tensile strength transversely to its longitudinal direction was sufficiently high, too.

Figure 2:
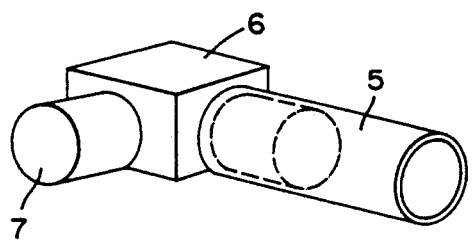
FIG. 2 is a perspective view how a tray (shown in a part in the drawing) are assembled from the component parts.
Figure 3:
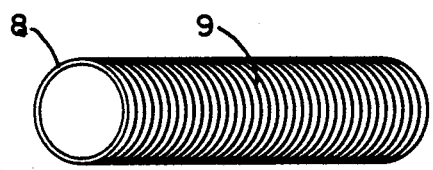
FIG. 3 is an explanatory view showing how carbon fibers are wound up cylindrically.

The cylindrical carbon fibered component parts obtained as above-described were assembled to trays as illustrated in FIG. 2. The trays were light in weight, and had good thermal resistibility.

I claim:

1. A tubular web for use in furnace atmosphere of a temperature higher than 1,200° C., which consists of at least two layers of carbon fiber filaments having a tensile strength of 100–500 kg./mm.$^2$, one of said two layers being composed of said carbon fiber filaments wound up cylindrically with a diameter corresponding to the diameter of said tubular web, and the other of said two layers being composed of said carbon fiber filaments wound up over said one layer cylindrically so as to make innumerable intersections with the carbon fiber filaments of said one layer, and the filaments of said layers being bound integrally to each other by adhesives primarily at said intersections to form a tubular web having a thickness of less than 1 mm.

2. A belt conveyor made from a tubular web of the type defined in claim 1, including providing a plurality of said tubular webs, flattening said webs, aligning said webs in a series, and hingedly connecting together the confronting ends of said webs to form said belt conveyor.

3. A tray made from a plurality of tubular webs of the type defined in claim 1, including providing a block connector having intersecting plane surfaces with reduced-diameter, circular projections extending form each of said surfaces, and inserting one end of one said tubular webs over each of said circular projections to form part of said tray.

* * * * *